Patented Feb. 23, 1937

2,071,681

UNITED STATES PATENT OFFICE 2,071,681

CEMENTITIOUS COMPOSITION AND PROCESS OF MAKING THE SAME

Lorrin T. Brownmiller, Scarsdale, N. Y., assignor to Bakelite Building Products Co., Inc., New York, N. Y., a corporation of Delaware No Drawing. Application June 12, 1933, Serial No. 675,460

15 Claims. (Cl. 106—24)

This invention relates to improvements in building materials and in particular to an addition or treatment for cements or mixtures containing cements whereby said cementitious materials may be utilized in their innumerable applications and the common blemish, technically known as efflorescence, resisted.

In the past little success has attended attempts to overcome efflorescence and its effect has come to be taken as a matter of course. Perhaps the best known treatment has comprised the use of gaseous carbon dioxide or its aqueous combination, carbonated water. The treatment has not always been effective and its application has always been necessary during the actual use of the wet cement mixture. The gaseous form would permit only surface treatment and special chambers were required for its application. Carbonated water, because it lost its usefulness when the charge had dissipated, could only be mixed in small batches with the cementitious mixture and this had to be done on the job. Such treatments were not simple to carry out; were relatively costly because of the loss of carbon dioxide and the large amount necessary for treating the cement; and required more intelligent workmen and careful manipulation. In all, the processes were costly ones and very restricted in their application.

It is therefore the object of this invention to provide an unrestricted, simple and economical method and means of effectively resisting efflorescence.

More particularly the objects of my invention may be enumerated as the provision of—

An ingredient that may be mixed during manufacture with a dry pulverized cement and that will effectively resist efflorescence when said cement is put to use;

An ingredient for a wet mixture of cement that will aid in the prevention of blooming;

An admixture of cement and an anti-bloom ingredient comprising a soluble fluoride;

A mixture of water and a soluble fluoride as an addition to a cement for the prevention of efflorescence;

A cementitious coating that will not bloom under weathering;

Roofing material having a cementitious coating including a soluble fluoride as an aid in the prevention of efflorescence.

With the above and other objects in view the invention consists of the improved material, the ingredients therein, process, parts and combinations thereof as set forth in the following specification and in the claims, including all equivalents thereof.

In order to better understand my invention a technical interpretation of the term efflorescence is necessary. The standard dictionary gives the meaning of the term efflorescence to express a blooming, flowering or breaking out on the surface of a cement during weathering. This, in the form of a scum or deposit of white crystals.

One of the constituents of cements, for instance, hydraulic cements such as Portland cements commercially known as Incor, Lehigh or Medusa and/or hydraulic limes is tricalcium silicate ($3CaO.SiO_2$). Upon mixing with water a reaction occurs in which calcium hydroxide is formed. Also calcium hydroxide is formed in, for instance, plasters such as lime and gypsum plasters. Under the action of the weather some of this calcium hydroxide dissolves in the water when the cement becomes moist or water soaked and comes to the surface; upon coming in contact with the carbon dioxide of the air calcium carbonate is formed as a crystalline deposit. It is very insoluble and resists removal by subsequent rains showing as bloom or efflorescence.

My invention comprises therefore the treatment of any cement with an ingredient comprising a salt either solid or in solution that will resist the formation of an insoluble calcium carbonate deposit on its surface. The salt used to prevent blooming should be relatively soluble as compared with the corresponding calcium salt but is desirably not so soluble as to readily be washed out of the cement by rain. I preferably use a salt in such amounts that will form a saturated solution with the mixing water of the cement and leave an excess of the salt and/or a mixture of a relatively insoluble salt with a more soluble salt, the soluble salt acting to precipitate insoluble calcium salts at the time the cement is mixed and for a relatively short period after application, and the relatively insoluble salt remaining in the cement to react with the minor amounts of calcium hydroxide which are gradually liberated as the cement ages. In the case of such mixtures the relatively soluble salt increases the amount of salt which is not in solution and, thus, in effect, provides a super-saturated solution of the insoluble salt while the concentration of the higher soluble salt is sufficient to react with any free lime.

In my experimentation upon building materials and especially in the surfacing of mineral coated asphalt shingles with cement, I have tried as an addition to the cement many ingredients including such salts as ammonium carbonate, aluminum chloride, sodium carbonate, magnesium carbonate, sodium fluoride, potassium fluoride, magnesium fluoride, ammonium fluoride, aluminum fluoride, potassium oxalate and sodium oxalate, and have found that those salts having solubilities under six parts per hundred in water at substantially room temperature are most effective as the relatively insoluble salt. Sodium fluoride, having a solubility of about 4, is very effective, but sodium carbonate with a solubility of 7 or more does not prevent bloom as the cement ages although it may be used in the mixture as the relatively soluble salt to resist immediate blooming, particularly where a relatively large amount of free lime is present. Among the relatively insoluble salts I at present prefer sodium fluoride because of its comparatively low cost in addition to its effective action. For some reason probably connected with the presence of fluorine in a simple salt I have found the fluorides to be particularly effective.

In practicing my invention such as, for instance, in the surfacing of mineral surfaced shingles, I mix with a quantity of pulverulent cement a soluble fluoride such as sodium fluoride. I have found that the most suitable quantity to be added insofar as its effect upon the setting qualities of the cement and upon the weathering properties of the finished shingle are concerned is between five to seven per cent by weight of the cementitious ingredient. On either side of this range I have found that between two and five per cent and between seven and ten per cent are effective quantities but not as desirable. To such a mixture I add if desired, a color aggregate and water and after thoroughly mixing, apply it as a coating forcibly or otherwise to the mineral coated base material, preferably a web. Thereafter, before or after the coating has initially set, if a web is used, it is cut into shingle sizes. The elements are then stacked for curing under control in a moist chamber for a period of about twelve hours. I may if I desire apply my dry cementitious composition directly to a wetted sheet of base material or I may dust it upon the dry sheet and thereafter spray it with a mist of water. Further, I may initially prepare my anti-bloom ingredient in solution with water and thereafter mix it with the dry or wet cement before use. I prefer, however, to have the anti-bloom ingredient added in suitable amount to the pulverulent cement during its process of manufacture preferably at the time the burnt ingredients forming the cement are being ground in order to obtain a thorough mixing. This preparation of the cement permits an unskilled workman to use the prepared cement according to custom without costly special or additional manipulation and also such step does not add to the labor cost of the manufactured cement.

In the coating thus applied are the ingredients cement, water and sodium fluoride. As previously stated calcium hydroxide is formed by reaction of the tricalcium silicate of the cement with water; and with the presence of a soluble fluoride a further reaction takes place between the calcium hydroxide and the soluble fluoride, which may generally be expressed as Ca(OH)$_2$+soluble fluoride→
insoluble CaF$_2$+soluble salt 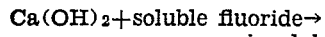

Specifically where sodium fluoride has been used the following reaction takes place Ca(OH)$_2$+2NaF=CaF$_2$+2NaOH 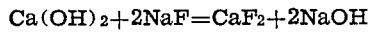

to form an insoluble calcium fluoride and hydroxide. The latter washes away. To some extent it may react with the carbon dioxide of the air to form sodium carbonate but this also washes away. As the calcium fluoride in the coating is insoluble, no calcium hydroxide can be formed and brought to the surface to form the undesirable crystalline deposit or bloom.

As previously stated the preferred salt is one which has a relatively low solubility. The amounts of sodium fluoride given are sufficient to effectively resist blooming in the case of substantially all cements. Where the cement contains a relatively large proportion of free lime I prefer to include a salt of the high solubility type which may be somewhat in proportion to the amount of free lime; for instance, where the cement will generate a total of seven per cent of calcium hydroxide of which say one per cent is free in the cement as manufactured, four per cent may appear in the first few weeks after setting and two per cent during the remaining life of the cement, a very soluble salt such as potassium fluoride or hydrated sodium carbonate (Na$_2$CO$_3$.10H$_2$O) may be used to combine with the one per cent calcium hydroxide, sufficient being used to combine with that part of the four per cent of calcium hydroxide which will come out quickly and sufficient of the relatively insoluble salt may be used to combine with the remainder of the calcium hydroxide.

While I have described the use of my anti-bloom ingredient in a surfacing for shingles I wish it to be understood that it may be effectively employed in mortar, building blocks, walls and in any article or application where a cementitious material is employed and where it is desired to resist efflorescence.

Further while I have described and prefer the ingredient to be mixed in or applied to the surface of the cement before it has set and hardened, it may also be used by applying in solution or as an admixture as a surface treatment after the cement has fully hardened. In this instance the fluoride will penetrate the pores of the cement to a considerable depth and permanently convert any calcium hydroxide in its path into calcium fluoride thereby sealing the pores of the cement. Thereafter this sub-surface skin layer will act as a barrier against the outward movement of any calcium hydroxide.

The use of ingredients such as sodium fluoride in cement also offer other advantages, among which are that when the cement is used as a surfacing for roofing material, mildew may be prevented and further, sodium fluoride being a powerful insecticide, insects such as ants, plaster bugs, etc. will not be able to exist in structures where this ingredient has been added to the cement.

From the above description it may be readily seen that I have provided a treatment for cements that is effective in its results and that may be economically carried out. By its use the unsightly stains of efflorescence may be avoided. While I have described various combinations that may be used and a form of their application it will be obvious to those skilled in the art that modifications may be made in the details involved without departing from the spirit of my invention which is to be construed as broadly as the following claims taken in conjunction with the prior art, may allow.

I claim:

1. A composition of material comprising a hydraulic cement and a soluble salt comprising a soluble fluoride, in the proportion of at least two parts of the salt per hundred parts of cement and in amounts sufficient to substantially prevent efflorescence of the composition upon exposure to the weather.

2. A composition of material comprising a ground cementitious mixture containing tricalcium silicate and a soluble fluoride having a solubility range substantially between four and seven parts per hundred in cold water and in sufficient amount to substantially prevent efflorescence.

3. A composition of material comprising a burnt and pulverized mixture containing tricalcium silicate and a soluble salt comprising sodium fluoride said salt comprising at least two per cent of the mixture.

4. A wet cementitious mixture comprising a hydraulic cement, water, and sodium fluoride in sufficient amounts to substantially prevent efflorescence.

5. Roofing material having a cementitious coating comprising a hydraulic cement and a soluble fluoride as an aid in the prevention of efflorescence, said fluoride comprising substantially between two and ten percent by weight of the hydraulic cement.

6. An anti-bloom treatment for cementitious materials comprising adding water to a hydraulic cement containing as an ingredient tricalcium silicate to form by a reaction calcium hydroxide, and adding between two and ten percent by weight of the cement of a soluble fluoride to form insoluble calcium fluoride and a soluble salt.

7. A process of treating cementitious materials for the prevention of efflorescence, comprising preparing a dry mixture of hydraulic cement containing tricalcium silicate and a soluble salt having a solubility range of at least four parts per hundred in cold water comprising a soluble fluoride, adding water to the mixture to cause a chemical reaction, said tricalcium silicate reacting to form calcium hydroxide and said calcium hydroxide reacting to form an insoluble calcium fluoride and a soluble salt.

8. A process of treating a cementitious material to prevent the collection of calcium hydroxide upon its surface to form calcium carbonate crystals as a bloom, comprising including in the cementitious mixture before setting, a soluble fluoride having a solubility range substantially between four and seven parts per hundred in cold water that will react with said calcium hydroxide to form an insoluble calcium fluoride and a soluble salt in said material.

9. A process of manufacturing an anti-bloom hydraulic cement, comprising adding to the burnt ingredients of the cement when grinding, a salt comprising a soluble fluoride in the proportion of from two to ten parts per hundred of cement.

10. A cementitious composition for roofing and siding elements comprising a cementitious material and a soluble salt comprising a soluble fluoride as an aid in the prevention of efflorescence, said fluoride having a solubility of at least four parts per hundred in cold water.

11. A composition of matter comprising cementitious material and an ingredient in the prevention of blooming, a soluble salt comprising sodium fluoride in amounts of about ten percent or less by weight of the cementitious ingredient.

12. A cementitious composition comprising a wet mixture of cement and an anti-bloom addition comprising sodium fluoride used in the proportion of at least two parts of sodium fluoride per hundred parts of dry cement.

13. A composition of matter comprising a cementitious material and a de-efflorescing mixture comprising a plurality of soluble fluorides one of said fluorides comprising sodium fluoride.

14. A composition for building material comprising cement and a saturated solution comprising water and a soluble fluoride, said fluoride being present in amounts of about ten percent or less by weight of the cementitious ingredient.

15. A cementitious composition comprising a hydraulic cement and a de-efflorescing agent comprising a soluble salt selected from a group of salts each having a solubility range up to six parts per hundred in cold water and consisting of a radical of a substantially insoluble calcium salt and a radical of a member of a group of soluble carbonates and insoluble hydroxides, said agent comprising between five to 10 percent of the composition.

LORRIN T. BROWNMILLER.

---

Certificate of Correction

Patent No. 2,071,681.

February 23, 1937.

LORRIN T. BROWNMILLER

It is hereby certified that errors appear in the printed specification of the above numbered patent requiring correction as follows: Page 1, second column, line 14, for "(3CaCO.SiO₂)" read (3CaO.SiO₂); page 2, second column, line 6, after "and" insert *sodium*; and that the said Letters Patent should be read with these corrections therein that the same may conform to the record of the case in the Patent Office.

Signed and sealed this 17th day of August, A. D. 1937.

[SEAL]

LESLIE FRAZER,
*Acting Commissioner of Patents.*

Certificate of Correction

Patent No. 2,071,681.  
February 23, 1937.

LORRIN T. BROWNMILLER

It is hereby certified that errors appear in the printed specification of the above numbered patent requiring correction as follows: Page 1, second column, line 14, for "(3CaCO.SiO$_2$)" read *(3CaO.SiO$_2$)*; page 2, second column, line 6, after "and" insert *sodium*; and that the said Letters Patent should be read with these corrections therein that the same may conform to the record of the case in the Patent Office.

Signed and sealed this 17th day of August, A. D. 1937.

[SEAL]

LESLIE FRAZER,  
*Acting Commissioner of Patents.*